March 10, 1925.
G. R. LAWRENCE
LOCKING CLIP
Original Filed Feb. 3, 1922
1,529,438
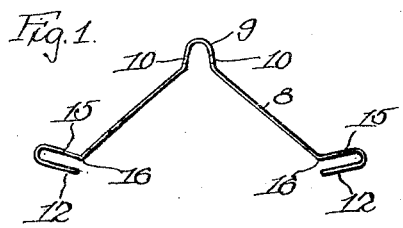
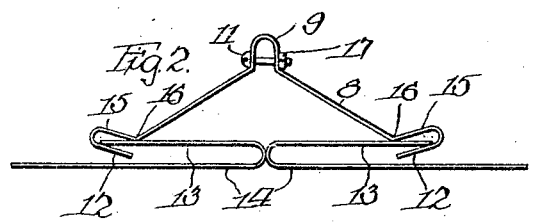
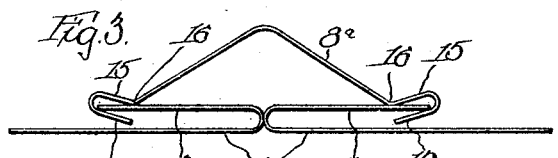
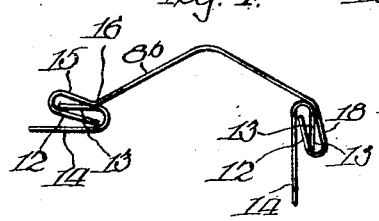
Inventor.
George R. Lawrence:
By Chas. C. Tillman
Atty.

Patented Mar. 10, 1925.

1,529,438

UNITED STATES PATENT OFFICE.

GEORGE R. LAWRENCE, OF CHICAGO, ILLINOIS.

LOCKING CLIP.

Original application filed February 3, 1922, Serial No. 533,860. Divided and this application filed March 10, 1924. Serial No. 698,189.

*To all whom it may concern:*

Be it known that I, GEORGE R. LAWRENCE, a citizen of the United States, residing at Chicago, in the county of Cook and State of Illinois, have invented certain new and useful Improvements in Locking Clips, of which the following is a specification.

The present invention relates to locking clips, and this particular application is a division of my co-pending application, Serial Number 533,860, filed February 3, 1922, for Letters Patent for improvements in ovens, upon which application Letters Patent Number 1,486,528, was issued to me on the 11th day of March, 1924, and is directed to a type of clips shown and described in my aforesaid co-pending application, for use in locking or holding together adjacent or abutting structural units, entering into the make-up of the oven.

The present invention, while primarily intended for use in ovens of the type disclosed in my said co-pending application in locking or securely holding together or in place at their adjacent or meeting surfaces certain units of the oven, and so that hermetically sealed joints will be provided, to the end, that the passage of dust and the like into the oven will be prevented, yet, the invention is applicable for use in numerous other kinds of structures, and I wish it understood that I do not desire to be limited in its application, but may employ it wherever it may be found desirable or applicable without a departure from the spirit of the invention as expressed in the appended claims forming a part hereof.

One of the objects of the invention is the provision of a very simple, inexpensive, strong and durable clip for locking parts together in relative positions to one another.

Another object is the provision of a locking clip of such construction and characteristics that it can be readily attached to or detached from the locked members, for reuse, if desired.

It is another and important object of the invention to provide a locking clip having means co-operating with engaging parts of the members to be locked or held together, or in relative positions with respect to one another, whereby air tight or hermetically sealed joints will be afforded between the clip and said engaging parts.

Other objects and advantages of the invention will be disclosed in the following description and explanation.

In the accompanying drawing, which illustrates embodiments of the invention, fragments of a pair of parts to be connected together by the clip are shown, which fragmental parts may be equivalent to the clip-engaging parts of a pair of the adjoining units of the oven shown in my said co-pending application; but as before stated, as the clips embodying the invention are of general utility and not limited in their application to any particular structure, I have shown in the drawing only fragments of a pair of parts to be united or locked by the clips so as to clearly illustrate the principles of the invention and the application of the clip to the clip-engaging parts or portions of the members to be locked or held together thereby, it being understood that said parts to be united may be of any kind so long as each has a clip-engaging member or portion.

In the drawing,—

Fig. 1 is an end view in elevation of a clip embodying one form of the invention, showing it with its parts in about the positions they will normally occupy with respect to one another.

Fig. 2 is a similar view showing the clip in operative position on the clip-engaging members of the parts to be locked or held together thereby.

Fig. 3 is a view similar to Fig. 2 but illustrating a modification in the construction of the clip.

Fig. 4 is an end view in elevation showing still another modification in the form of the clip.

Like numerals of reference refer to corresponding parts throughout the different views of the drawing.

Referring now more particularly to Figs. 1 and 2, of the drawings, the reference numeral 8 designates generally or as a whole one of the clips which is made of sheet metal and may be made of any desired length and other dimensions. The clip of the form now under consideration is provided about midway between the extremities of its sides with an outwardly extended loop 9 which is disposed longitudinally with respect to the clip and said loop is provided in each of its sides with one or more pairs of registering openings 10 for the reception of a screw-bolt or bolts 11 to be used for the purpose presently to be explained.

As shown, the sides of the clip diverge and each has at its side edge an inturned flange 12 to engage the free edge or end of a clip-engaging extension 13 on each of the parts 14 to be united and held or locked together by the clip.

The members 14 constituting the parts to be connected together by the clip are shown as being in contact with one another at their adjacent surfaces, and while they will generally be so placed, yet they may be spaced at their adjacent surfaces and held in such spaced relation by any desired means, not shown. The clip-engaging extensions or members 13 are of course located externally of the parts 14, and while they are shown as being connected to said parts at the adjacent surfaces thereof, yet it is manifest that said clip-engaging extensions may be connected to their respective parts 14 near the adjacent surfaces of said parts, yet extended therefrom in such a way as to permit the flanges 12 of the clip to be inserted between the free ends or edges of the members 13 and the surfaces adjacent thereto of the parts 14.

By reference to Figs. 1 to 3 inclusive of the drawing, it will be seen that each side of the clip is outwardly and cross-sectionally deflected as at 15 from the main body portion of each side of the clip, thus forming an inwardly disposed bent or bead portion 16 extending longitudinally of the strip to rest on the outer surfaces of the engaging members 13 and thereby forming air-tight closures between the clip and the members 13 or hermetically sealing the same at said points. Each of the flanges 12 is inwardly extended or cross-sectionally disposed in spaced relation to each of the outwardly deflected portions 15 as is clearly shown, and by this arrangement it is manifest that the free edges of the members 13 interposed between the flanges 12 and parts 15 will rest against the inner surfaces of the flanges 12 and thereby provide an additional air-tight closure.

It will be observed by reference to Figs. 1 and 2 of the drawing, that the openings 10 in the side walls of the loop 9 are located near the juncture of the sides of the clip with the loop 9, which loop is normally, see Fig. 1, inwardly flared. When the clip is in its normal condition as shown in Fig. 1, the free edges of the flanges 12 will be closer together than when the clip is applied to the clip-engaging members 13 as illustrated in Fig. 2, and by reason of this further divergence of the sides of the clip, the bead like formation 16 formed by the outwardly deflected portions 15 will be rendered more prominent as will be understood by reference to Figs. 1 and 2 of the drawing, thus positively presenting to the outer surface of the clip-engaging members 13 a sealing rib or bearing.

It will be understood that the clips are made of resilient material, and after springing the sides thereof sufficiently from each other to permit the flanges 12 to engage the free edges of the members 13 and releasing pressure from the clip, the resultant reaction of the yielding clip will cause the flanges 12 and portions 15 and 16 to occupy about the positions relative to the members 13 shown in Fig. 2, of the drawing. Ordinarily, the tension of the clips will be sufficient to hold them in engagement with the clip-engaging members 13 of the parts to be connected together, but by inserting a bolt 11 in one or more of the pairs of openings 10, depending on the length of the clip, it is apparent that the walls of the loop 9 can be forced towards each other by means of a nut 17, screwed onto one end of said bolt or bolts, thus causing the engaging portions of the sides of the clip to more tightly clamp the edges of the clip-engaging members 13, in which position the parts will be maintained by reason of the action of the bolts and nuts, as well as the clip itself.

In Fig. 3 of the drawing I have shown a modification which consists in the employment of a clip designated as a whole by the numeral 8ª which is of exactly the same construction as above described, with the exception that the loop 9 and bolt and nut of the latter are omitted in the modified form.

In Fig. 4 is shown a modification in the clip more particularly intended to be used for connecting parts 14 together when the clip-engaging members 13 of said parts are located substantially at right angles to one another instead of in substantially the same plane as shown in the other constructions. In the modified form now under consideration, the clip is designated as a whole by the numeral 8ᵇ, and instead of having at each of its side edges cross-sectionally deflected members 12, 15 and 16, of the construction above described, it has such members at only one of said side edges, and is provided at its other side edge with a portion 18 which is cross-sectionally deflected from its side of the clip in the opposite direction from that of the portion 15 at the other side of the clip and at a greater degree of deflection. This deflected portion 18 has extended inwardly of the clip and spaced therefrom a flange 12 to engage a clip-engaging member 13 which is located substantially at a right angle to the clip-engaging member 13 on the other one of the parts 14 to be connected together. By this arrangement it will be seen that the free edge of the member 13 engaging the portion 18 will also engage the inner surface of the flange 12 extended inwardly from the deflected part 18 of the modified form now under consideration, thus forming a double airtight closure.

From the foregoing and by reference to the drawing, it will be readily understood and clearly seen that by my improvements I have provided a clip which can be readily attached to the parts to be held together thereby or if desired, can be easily detached therefrom. It will also be understood that the space between the sides of the clip and the clip-engaging members 13 of the parts 14 to be held together can be supplied with a filling of plastic material such as plaster of Paris or any other suitable substance which is frangible after becoming set or hardened, thus, the material can be readily crushed when it is desired to detach the clip from its support.

Having thus fully described my invention, what I claim as new and desire to secure by Letters Patent is:

1. A locking clip consisting of a piece of resilient material cross-sectionally deflected from the plane of its side edges and having at one of its side edges an inturned flange spaced from said edge, that side edge of the clip on which said flange is provided being upwardly deflected from the said plane of the side edges of the clip.

2. A locking clip consisting of a piece of resilient material cross-sectionally deflected from the plane of its side edges and having at one of its side edges an inturned flange spaced from said edge and at its other side edge means to engage a part on one of the parts to be held together by the clip, that side edge of the clip on which said flange is provided being upwardly deflected from the said plane of the side edges of the clip.

3. A locking clip consisting of a strip of resilient material cross-sectionally deflected from the plane of its side edges and having at each of its side edges inturned flanges spaced from said edges, the side edges of said strip being outwardly deflected from the planes of said cross-sectionally deflected portion forming bearings.

4. A locking clip consisting of a piece of resilient material cross-sectionally deflected from the plane of its side edges and provided between said edges with an outwardly extended loop, said loop having a pair of registering openings in its side walls, said piece having at its side edges inturned flanges spaced from said edges, the side edges of said piece being outwardly deflected from the planes of said cross-sectionally deflected portion forming bearings, a screw bolt having a head on one of its ends and extended through openings in said loop and a nut engaging the other end of said bolt.

GEORGE R. LAWRENCE.